(12) United States Patent
Parrott et al.

(10) Patent No.: US 7,207,522 B2
(45) Date of Patent: Apr. 24, 2007

(54) SAFETY DEVICE TRIGGER FOR ACTIVATING A SAFETY DEVICE

(75) Inventors: David G. Parrott, Escondido, CA (US); Don V. Hitzfield, Mission Viejo, CA (US)

(73) Assignee: Apical Industries, Inc., Oceanside, CA (US)

( * ) Notice: Subject to any disclaimer, the term of this patent is extended or adjusted under 35 U.S.C. 154(b) by 252 days.

(21) Appl. No.: 10/641,915

(22) Filed: Aug. 15, 2003

(65) Prior Publication Data

US 2005/0040285 A1   Feb. 24, 2005

(51) Int. Cl.
 *B64C 25/56* (2006.01)
(52) U.S. Cl. .................................................. 244/107
(58) Field of Classification Search ................ 244/105, 244/106, 107, 100 A, 137.2, 905, 233
 See application file for complete search history.

(56) References Cited

U.S. PATENT DOCUMENTS

| | | | |
|---|---|---|---|
| 1,322,979 A | | 11/1919 | Waite |
| 1,774,024 A | * | 8/1930 | Lobelle .................. 244/215 |
| 1,818,597 A | * | 8/1931 | Adams et al. ............ 244/107 |
| 2,235,034 A | * | 3/1941 | Molloy et al. ........... 280/47.32 |
| 2,400,173 A | * | 5/1946 | Slate ..................... 244/106 |
| 2,507,913 A | * | 5/1950 | Lanser .................... 114/267 |
| 2,705,117 A | * | 3/1955 | Ross ..................... 244/233 |
| 2,921,481 A | | 1/1960 | Phelan |
| 3,004,737 A | * | 10/1961 | Lehberger et al. ...... 244/100 A |
| 3,028,762 A | | 4/1962 | Stutz |
| 3,091,782 A | * | 6/1963 | Sclafani .................. 244/101 |
| 3,144,919 A | | 8/1964 | Foote et al. |
| 3,348,427 A | | 10/1967 | Wilkey |
| 3,507,466 A | * | 4/1970 | Fleur ...................... 244/105 |
| 3,653,277 A | | 4/1972 | Gilmore |
| 4,028,948 A | * | 6/1977 | Frost et al. ................ 74/2 |
| 4,072,065 A | | 2/1978 | Perrella |
| 4,309,740 A | | 1/1982 | Takata |
| 4,354,398 A | | 10/1982 | Porter |
| 4,382,567 A | | 5/1983 | Fredericks et al. |
| 5,259,574 A | | 11/1993 | Carrot |
| 5,333,327 A | | 8/1994 | Redding et al. |
| 5,573,205 A | | 11/1996 | Arrone |
| 5,706,705 A | | 1/1998 | Stringer |
| 5,992,794 A | | 11/1999 | Rotman et al. |
| 6,301,991 B2 | | 10/2001 | Ficyk et al. |
| 6,338,456 B1 | | 1/2002 | Cairo-Iocco et al. |
| 6,371,410 B1 | | 4/2002 | Cairo-Iocco et al. |
| 6,382,558 B1 | | 5/2002 | Chiu |

FOREIGN PATENT DOCUMENTS

| | | |
|---|---|---|
| EP | 0869058 A2 | 10/1998 |
| GB | 2097732 A | 11/1982 |

* cited by examiner

*Primary Examiner*—Tien Dinh
(74) *Attorney, Agent, or Firm*—Peter K. Hahn; Luce, Forward, Hamilton & Scripps, LLP (57) ABSTRACT

An emergency floatation system for a helicopter includes a safety trigger device for inflating at least one raft during the course of an emergency. The safety trigger device includes a plurality of handles such that pulling any one of the plurality of handles triggers the inflation of the at least one raft.

13 Claims, 10 Drawing Sheets

SAFETY DEVICE TRIGGER FOR ACTIVATING A SAFETY DEVICE

FIELD OF THE INVENTION

The present invention is directed generally to safety device triggers, and more particularly, to a safety device trigger for deploying an emergency floatation system for a helicopter.

BACKGROUND OF THE INVENTION

Helicopters that travel over bodies of water are usually required to carry an emergency floatation system including a life raft for safety in the event of an emergency water landing. Inflation of the system is typically triggered from the cockpit of the helicopter using an actuator such as an electronic switch or a mechanical handle. However, these actuators are inherently unreliable do to circumstances that may occur during the course of an emergency water landing. For example, an emergency water landing could disable the pilot, making it difficult, if not impossible to reach the appropriate actuator. In addition, the impact of the crash may cause damage to the system making it impossible to deploy the life rafts. Another concern is the possibility of water damage to the electronic switch.

In view of these shortcomings, there exists a need for a helicopter including a more reliable actuator for inflating an life raft after an emergency water landing.

SUMMARY OF THE INVENTION

The present invention alleviates to a great extent the disadvantages of the known safety device triggers for helicopters by providing a more reliable safety trigger device that permits inflation of an emergency life raft from a plurality of locations including the cockpit and each side of a helicopter.

One aspect of the present invention involves an emergency floatation system for a helicopter, including a safety trigger device for inflating at least one raft, wherein the safety trigger device includes a plurality of handles, wherein pulling any one of the plurality of handles triggers the inflation of the at least one raft.

Another aspect of the present invention involves an emergency floatation system for a helicopter, including a safety trigger device for inflating at least one raft, wherein the safety trigger device includes a plurality of handles, wherein pulling any one of the plurality of handles triggers the inflation of the at least one raft, wherein the safety trigger device further includes a plurality of pull cords, a cam and at least one actuation cords, wherein the plurality of handles are attached to the cam by the plurality of pull cords such that pulling any one of the plurality of handles causes the cam to rotate, wherein the rotation of the cam pulls the actuation cords, which triggers the inflation of the at least one raft.

A further aspect of the present invention involves an emergency floatation system for a helicopter, including a safety trigger device for inflating at least one raft, wherein the safety trigger device includes a plurality of handles, wherein pulling any one of the plurality of handles triggers the inflation of the at least one raft, wherein the safety trigger device further includes a plurality of pull cords, a cam and at least one actuation cords, wherein the cam includes a first arm attached to the plurality of pull cords and a second arm attached to the at least one actuation cord, wherein at least one of the first arm and the second arm is bent to achieve a mechanical advantage in rotating the cam.

An additional aspect of the present invention involves an emergency floatation system for a helicopter, including a safety trigger device for inflating at least one raft, wherein the safety trigger device includes a plurality of handles, wherein pulling any one of the plurality of handles triggers the inflation of the at least one raft, further comprising a plurality of floats for supporting the helicopter on a body of water, wherein the system is adapted to be converted from a packed configuration to a partially deployed configuration, wherein, in the partially deployed configuration, the plurality of the floats are inflated and the at least one raft is packed, wherein the system is adapted to be converted from the partially deployed configuration into a fully deployed configuration when one of the plurality of handles are pulled, wherein, in the fully deployed position, the plurality of floats and the at least one raft are inflated with compressed gases chosen from the group consisting of Nitrogen, helium and air.

Yet another aspect of the present invention involves a safety trigger device for activating at least one safety device, including a plurality of pull cord assemblies, at least one actuation cord assembly and a cam, wherein pulling any one of the plurality of pull cord assemblies activates the at least one safety device.

A further aspect of the present invention involves a safety trigger device for activating at least one safety device, including a plurality of pull cord assemblies, at least one actuation cord assembly and a cam, wherein pulling any one of the plurality of pull cord assemblies activates the at least one safety device, wherein each pull cord assembly includes a handle at one end and is attached to a first arm of the cam at the other end such that pulling the handle causes the cam to rotate, wherein each actuation assembly is attached to a second arm of the cam at one end and to a safety device at the other end, wherein rotation of the cam causes each actuation cord assembly to trigger the activation of a safety device.

An additional aspect of the present invention involves a safety trigger device for activating at least one safety device, including a plurality of pull cord assemblies, at least one actuation cord assembly and a cam, wherein pulling any one of the plurality of pull cord assemblies activates the at least one safety device, wherein the cam includes a first arm attached to the plurality of pull cord assemblies and a second arm attached to the at least one actuation cord assembly, wherein at least one of the first arm and the second arm is bent to achieve a mechanical advantage in rotating the cam.

A further aspect of the present invention involves a safety trigger device for activating a safety device, including a pull cord an actuation cord and a cam including first and second arms, wherein the pull cord includes a handle at one end and is attached to the first arm at the other end such that pulling the handle causes the cam to rotate, and wherein the actuation cord is attached to the second arm at one end and to a safety device at the other end. Rotation of the cam causes the actuation cord to trigger the activation of the safety device. Preferably, at least one of the first arm and the second arm is bent to achieve a mechanical advantage in rotating the cam.

These and other features and advantages of the present invention will be appreciated from review of the following detailed description of the invention, along with the accompanying figures in which like reference numerals refer to like parts throughout.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Figure 1:
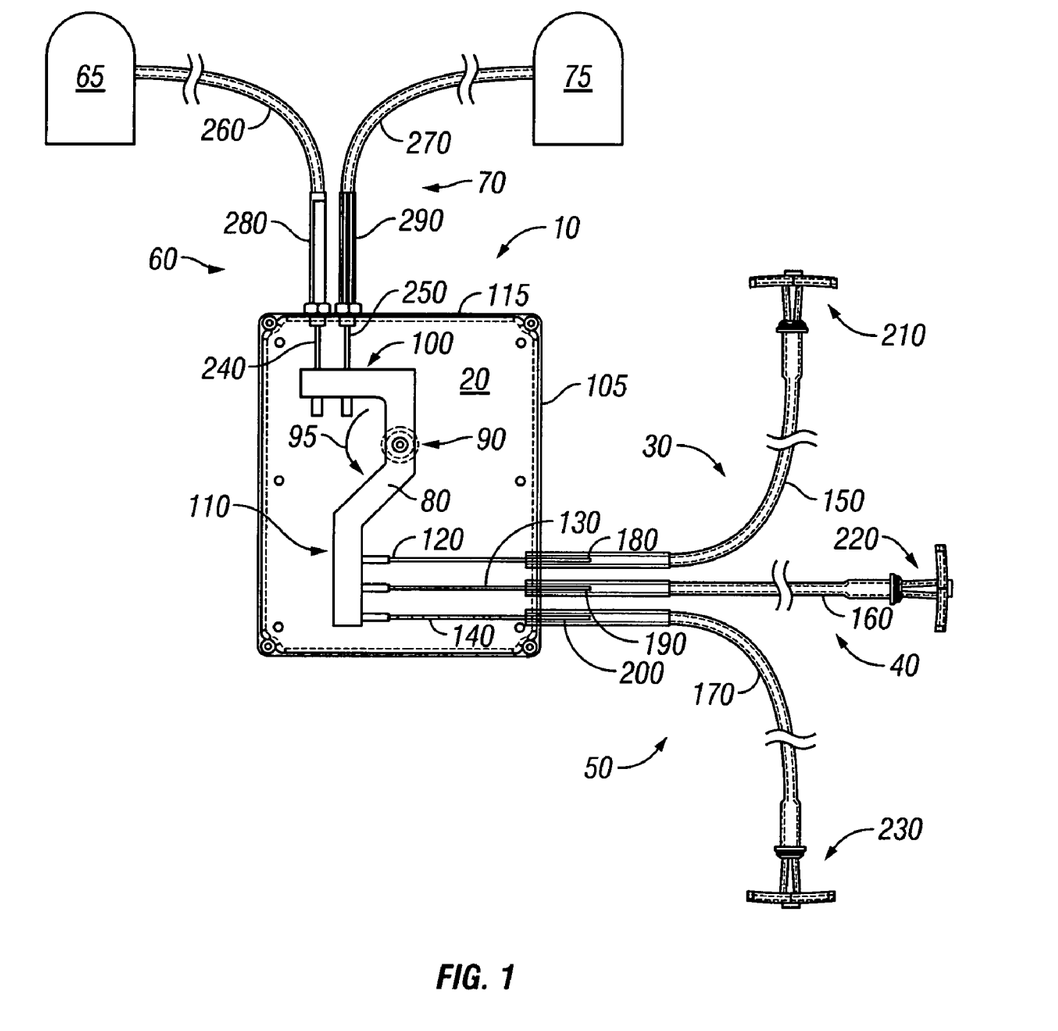
FIG. 1 is a sectional view of a safety trigger device in accordance with the principles of the present invention.

FIG. 1 shows a safety trigger device 10 comprising a cam box 20, pull cord assemblies 30, 40, 50 and actuation cord assemblies 60, 70. The cam box 20 includes a cam 80 having a first arm 100 attached to the pull cord assemblies and a second arm 110 attached to the actuation cord assemblies. Cam is preferably made from metal tubing including a hollow interior. Pull cord assemblies 30, 40, 50 include a cord 120, 130, 140, a flexible conduit 150, 160, 170, a support housing 180, 190, 200 and a handle 210, 220, 230, respectively.

Support housings 180, 190, 200 are fixedly attached to the flexible conduits at their proximal ends and fixedly attached to the cam box at their distal ends. Cords 120, 130, 140 are fixedly attached to handles 210, 220, 230 at their proximal ends and attached to the second arm of cam 80 at their distal ends. These attachments can be made using suitable means such as welding, threaded fasteners, adhesives or the like. Cords 120, 130, 140 are adapted to move freely within flexible conduits 150, 160, 170 and support housings 180, 190, 200 such that when a handle 210, 220, 230 is pulled, the cam is forced to rotate in a direction indicated by arrow 95.

The actuation cord assemblies 60, 70 include a cord 240, 250, a flexible conduit 260, 270 and a support housing 280, 290. Similar to the pull cords 120, 130, 140, the actuation cords 240, 250 are adapted to move freely within flexible conduits 260, 270 and support housings 280, 290. Support housings 280, 290 are fixedly attached to the cam box 20 at one end and fixedly attached to the flexible conduits 260, 270 at the other end. The attachments can be made using suitable means such as welding, threaded fasteners, adhesives or the like. Cords 240, 250 are fixedly attached to the first arm 100 of the cam 80 at one end and attached to the safety devices 65, 75 at the other end. These attachments can also be made using suitable means such as welding, threaded fasteners, adhesives or the like.

In operation, when one of the pull cord assemblies 30, 40, 50 is pulled, the cam 80 is forced to rotate about the pivot 90 in a direction indicated by arrow 95. The rotation of the cam 80 pulls cords 240, 250, which triggers the actuation of safety devices 65, 75. According to at least one embodiment described herein, the safety devices 65, 75 comprises emergency life rafts that are inflated with compressed gas.

As seen in FIG. 1, cam arms 100, 110 are bent to achieve a mechanical advantage when rotating the cam 80. According to a preferred embodiment, the first arm 100 is bent at a substantially 90-degree angle and the second arm 110 includes a pair of bends at substantially 135-degree angles. As would be understood to those of skill in the art, the arms 100, 110 can be bent at any number of different angles to achieve the desire mechanical advantage including, but not limited to, 30, 45, 120 and 135 degrees. In the illustrated embodiment, the pull cord assemblies 30, 40, 50 are attached to a first side wall 105 of the cam box 20 and the actuation cord assemblies 60, 70 are attached to a second side wall 115, which is substantially perpendicular to the first side wall 105.

Figure 2:
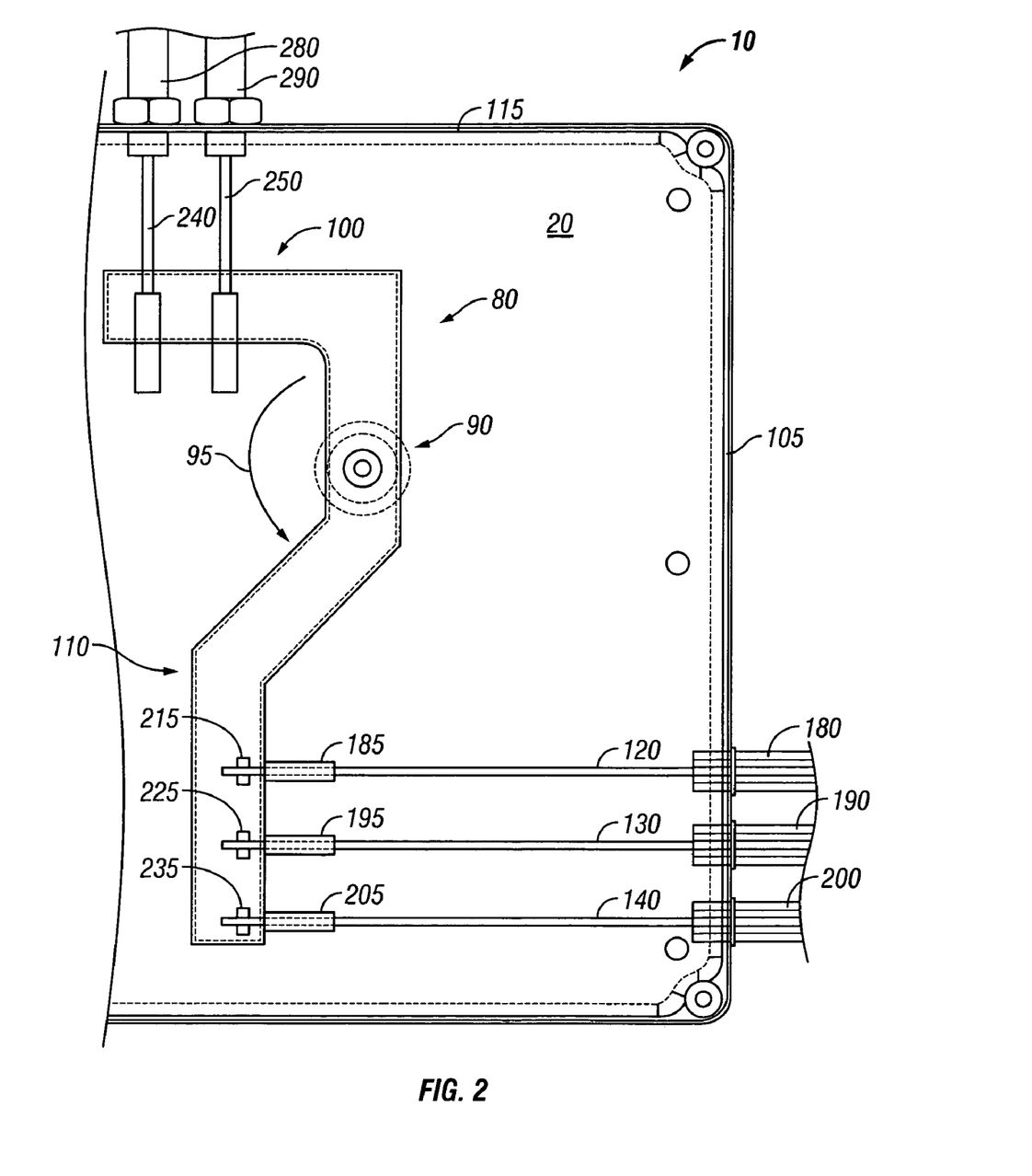
FIG. 2 is an enlarged sectional view of the safety trigger device of FIG. 1.
Figure 3:
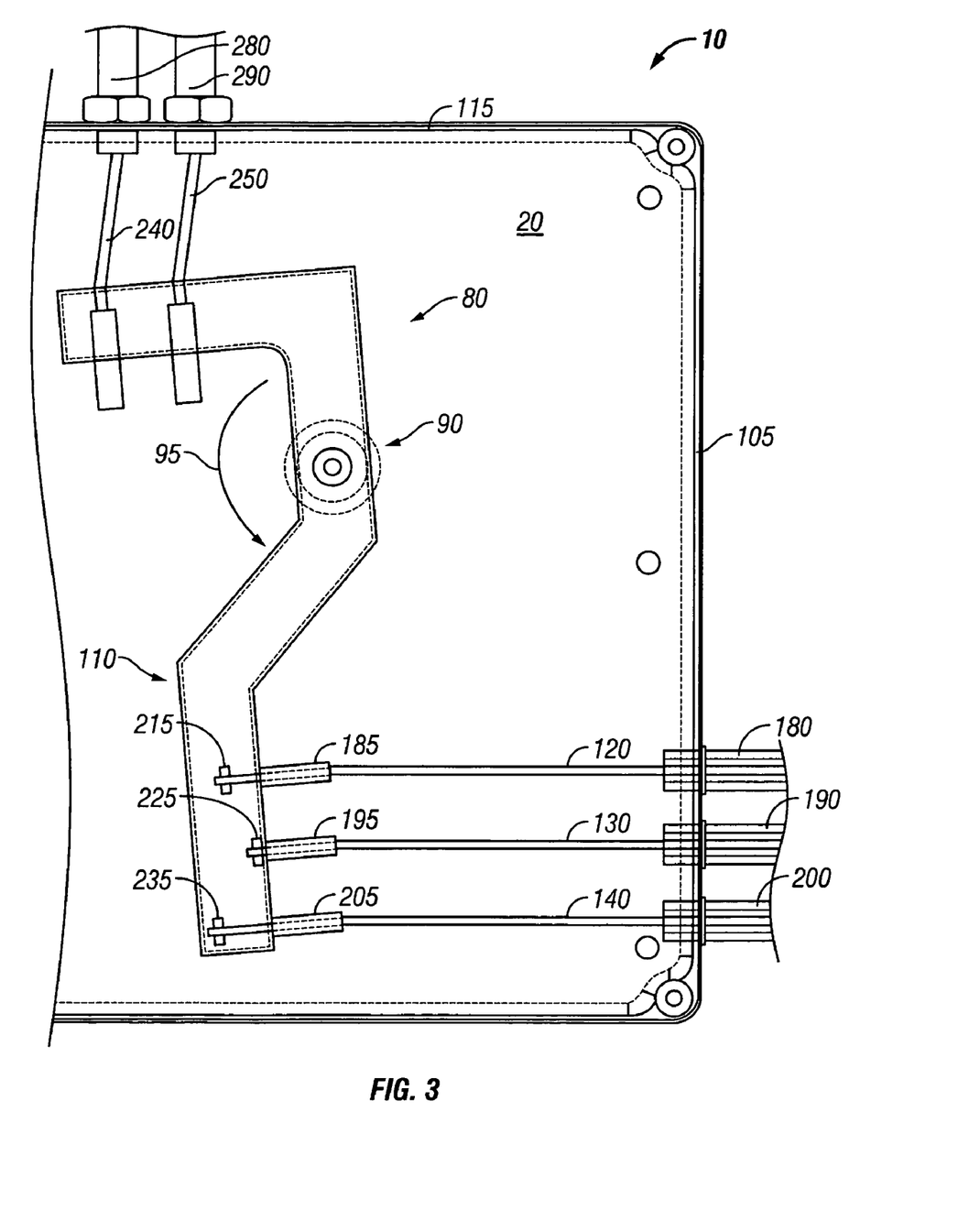
FIG. 3 is an enlarged sectional view of the safety trigger device of FIG. 1 showing the rotation of the cam.

As shown in FIGS. 2 and 3, cords 180, 190, 200 are preferably not fixedly attached to second arm 100 of cam 80. Instead, the distal ends of cords 180, 190, 200 pass through tubes 185, 195, 205, through a first wall 110a of arm 110 and into the hollow interior of arm 110. The cords may freely translate through the tubes and first wall. However, a stopper 215, 225, 235 is provided near the distal tip of each cord 180, 190, 200, respectively, preventing the distal tips from being pulled through the cam wall 110a. Suitable stoppers include nuts that are fixedly attached to the distal ends of the cords.

When one of the cords is pulled, the corresponding stopper is forced against wall 110a and the cam is forced to rotate. For example, as shown in FIG. 3, when cord 130 is pulled, stopper 225 is forced against wall 110a, which in turn causes cam 80 to rotate. As cam 80 rotates, the other cords 120, 140 freely translate through wall 110a, thus preventing the unwanted compression and bowing of cords 120, 140. In addition, the rotation of cam 80 in direction 95 pulls actuation cords 240, 250 away from side wall 115 causing the actuation of the safety devices 65, 75.

Figure 4:
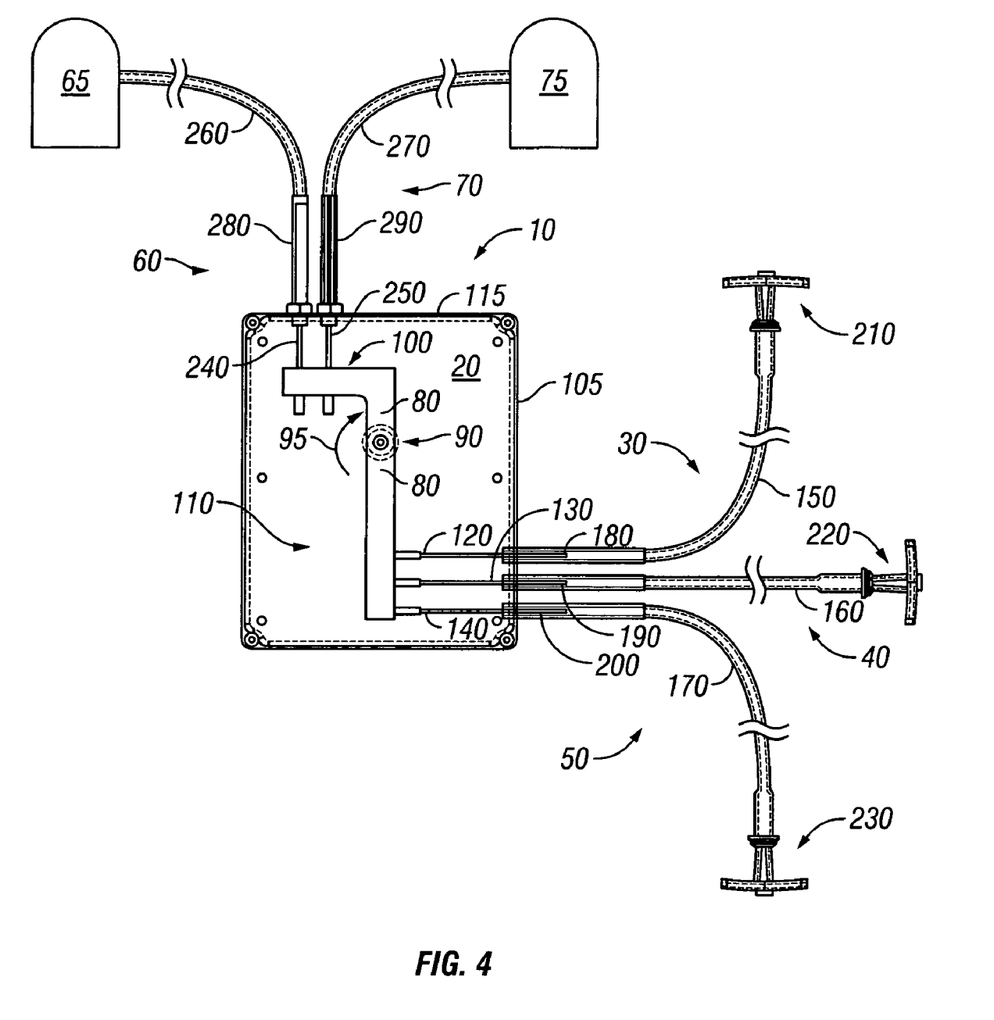
FIG. 4 is a sectional view of a safety trigger device in accordance with the principles of the present invention.
Figure 5:
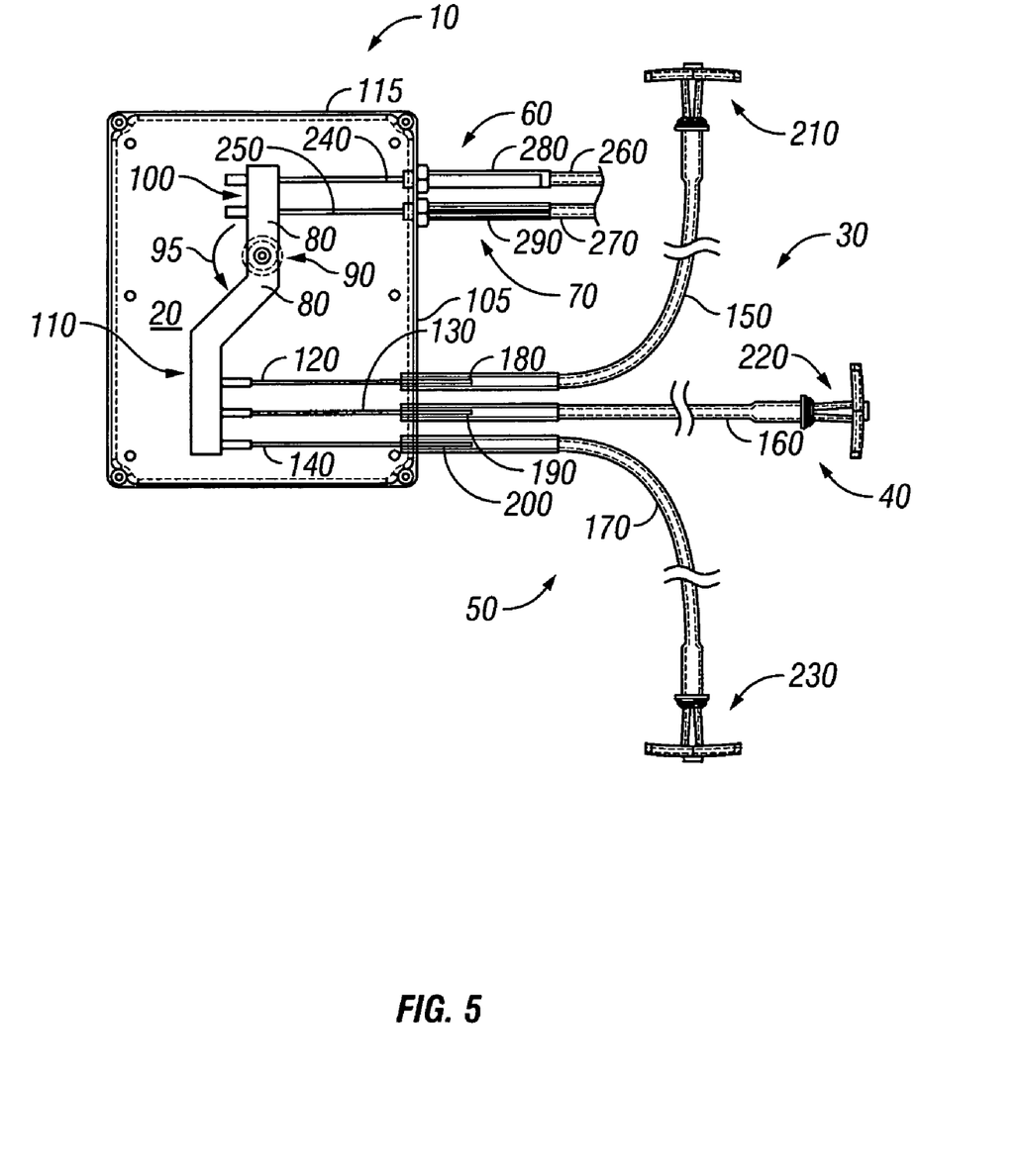
FIG. 5 is a sectional view of a safety trigger device in accordance with the principles of the present invention.

As seen in FIG. 4, according to an alternative embodiment, the first arm 100 is bent at a substantially 90-degree angle and the second arm 110 is substantially straight. The pull cord assemblies 30, 40, 50 and actuation cord assemblies 60, 70 are attached as disclosed above with respect to FIG. 1. As seen in FIG. 5, according to a further embodiment, the first arm 100 is substantially straight and the second arm 110 includes a pair of bends at substantially 135-degree angles. In this embodiment, the pull cord assemblies 30, 40, 50 and the actuation cord assemblies 60, 70 are all attached to the first side wall 105. According to other embodiments, the pull cord assemblies 30, 40, 50 and the actuation cord assemblies 60, 70 are attached on opposite or adjacent side walls of the cam box 20.

Referring again to FIG. 1, the second arm 110 is dimensioned to permit the attachment of a number of pull cord assemblies 30, 40, 50, providing multiple options for rotating the cam 80, thereby activating the safety devices 65, 75. Although FIG. 1 depicts the use of three pull cord assemblies 30, 40, 50, it should be understood to those of skill in the art that any number of pull cords can be used including, but not limited to one, two, three, four, five and six pull cords. The first arm 100 is dimensioned to permit the attachment of a number of actuation cord assemblies 60, 70. Each actuation cord assembly 60, 70 is adapted to actuate a safety device 65, 75 such as a floatation device when one of the pull cord assemblies 30, 40, 50 is pulled. Although FIG. 1 depicts the use of two actuation cord assemblies 60, 70, it should be understood to those of skill in the art that any number of actuation cords can be used including, but not limited to one, two, three, four, five and six actuation cords.

Cam box 20 is preferably a durable, waterproof, rustproof and generally resistant to the elements. Suitable materials include stainless steel, aluminum, carbon fiber, KEVLAR and hard plastics. The cords 120, 130, 140, 240, 250 and flexible conduits 150, 160, 170, 260, 270 are preferably made from a strong, water resistant material such as stainless steel. Suitable materials for the support housings 180, 190, 200, 280, 290 include stainless steel, aluminum and hard plastics.

According to some embodiments of the present invention, the safety device trigger 10 is used in an emergency floatation system for a helicopter, wherein the safety device is an emergency life raft that is inflated with compressed gas from a gas canister during an emergency. Such emergency floatation systems will now be described with respect to FIGS. 6–15.

Figure 6:
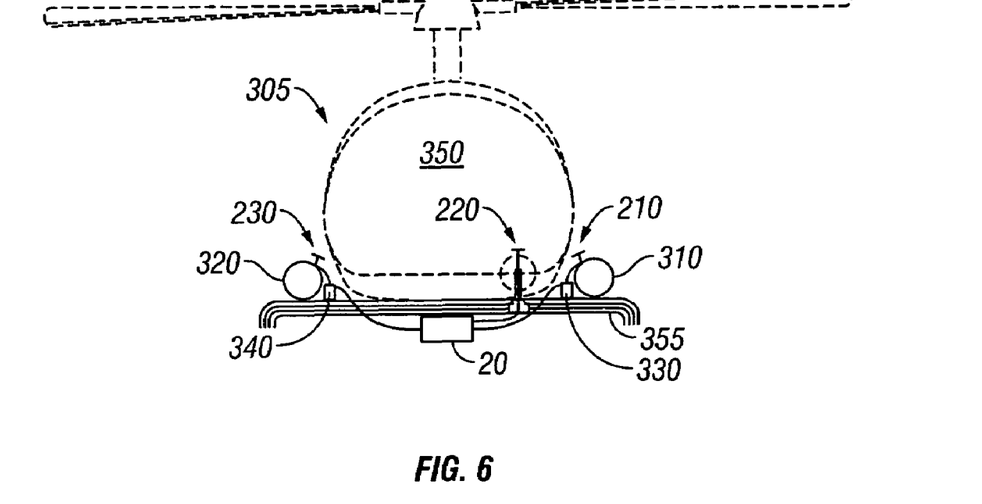
FIG. 6 is a front view of a helicopter including an emergency floatation system employing the safety trigger device of the present invention.

FIG. 6 shows an emergency floatation system 300 for a helicopter 305 including a safety device trigger 10, as herein disclosed with respect to FIGS. 1–5, for inflating a pair of life rafts 310, 320 from compressed gas canisters 330, 340. According to some embodiments, the safety device trigger includes cam box 20, first handle 210 located on one side of the helicopter, second handle 220 located within fuselage 350 and third handle 230 located on the other side of the helicopter 305. Preferably, the first and third handles 210, 230 are located close to the helicopter doors for greater accessibility after an emergency water landing.

As previously disclosed, when any of the handles 210, 220, 230 are pulled, the cam 80 is forced to rotate about the pivot 90, thereby pulling both actuation cords 60, 70. Pulling actuation cord 60 opens a valve on canister 330 causing it to release compressed gas and inflate life raft 310 from the packed configuration depicted in FIG. 6 to the deployed configuration depicted in FIG. 11. Similarly, pulling actuation cord 70 opens a valve on canister 340 causing it to release compressed gas and inflate life raft 320 from the packed configuration depicted in FIG. 6 to the deployed configuration depicted in FIG. 11. Therefore, pulling any one of the handles 210, 220, 230 causes both life rafts 310, 320 to inflate.

As seen in FIG. 6, the life rafts 310, 320 and canisters 330, 340 are positioned on top of the landing struts 355. According to other embodiments, the life rafts 310, 320 and canisters 330, 340 are located within the fuselage 350 of the helicopter 305. A suitable location for the cam box 20 depends upon the type of helicopter employed. As seen in FIG. 6, according to some embodiments, the cam box 20 is mounted to the underside of the helicopter's landing struts 355, which may require the use of a mounting bracket. According to other embodiments, the cam box 20 is mounted within the fuselage 350, attached to the bottom of fuselage 350 or mounted at any other convenient location.

Figure 7:
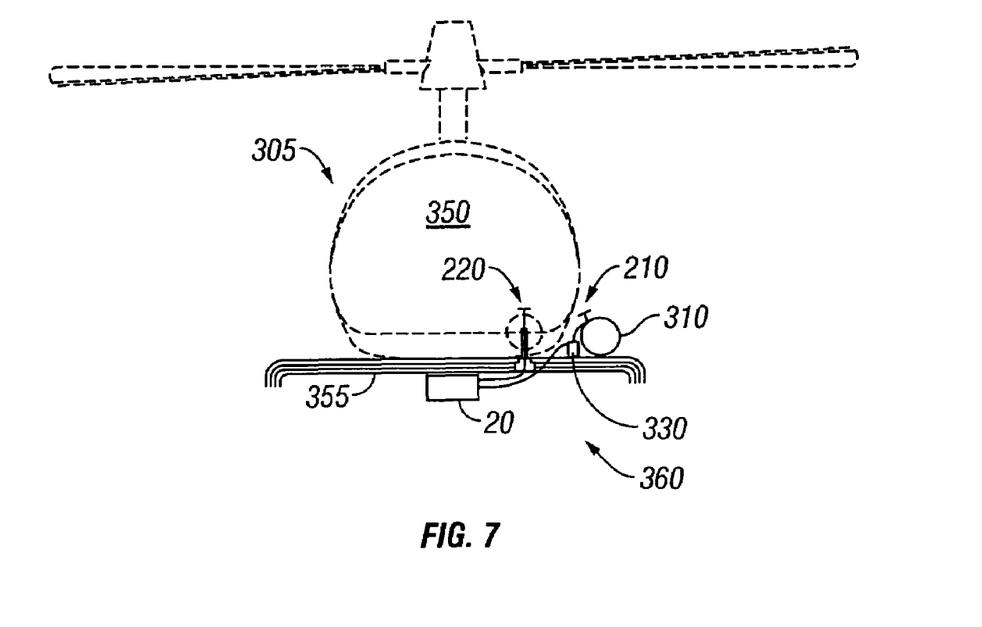
FIG. 7 is a front view of a helicopter including an emergency floatation system employing the safety trigger device of the present invention.

FIG. 7 shows an alternative emergency floatation system 360 for a helicopter 305 including a safety device trigger 10 for inflating a life raft 310 from a canister 330 of compressed gas. The safety device trigger 10 includes cam box 20, first handle 210 located on one side of the helicopter and second handle 220 located within fuselage 350.

FIGS. 8–10 and 15 show embodiments of an emergency floatation system 400, which includes a girt 410 for attachment to a landing skid 420 of the helicopter 305, an emergency life raft 310, a plurality of floats 440 and a flexible cover 450. Optionally, the plurality of floats 440 comprises a pair of large side floats 460, 470 connected by a smaller center float 480. As would be understood by those of skill in the art, the plurality of floats 440 may be arranged according to any number of different float configurations utilizing any number of individual floats without departing from the scope of the present invention.

Figure 8:
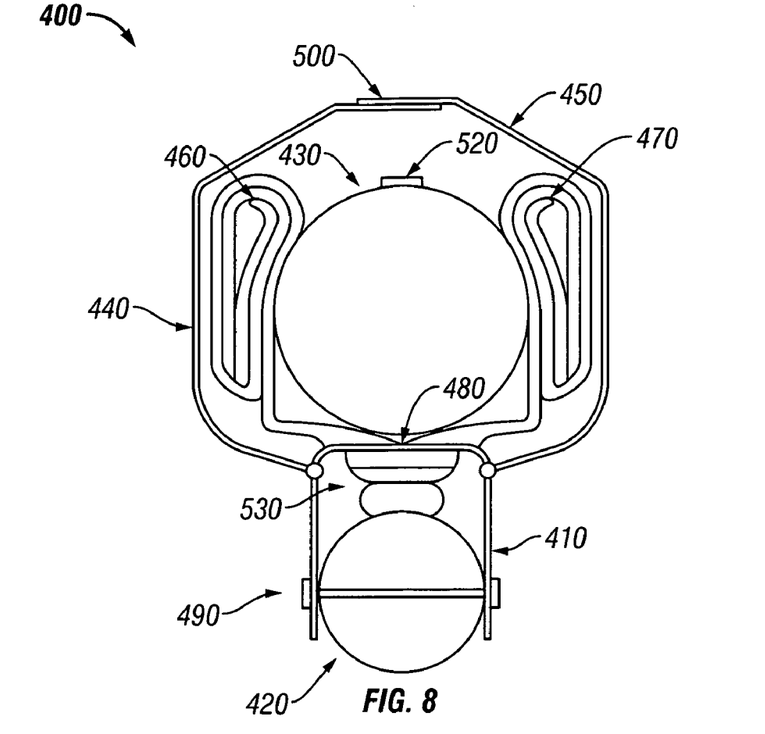
FIG. 8 is a sectional view of a packed emergency floatation system employing the safety trigger device of the present invention.
Figure 9:
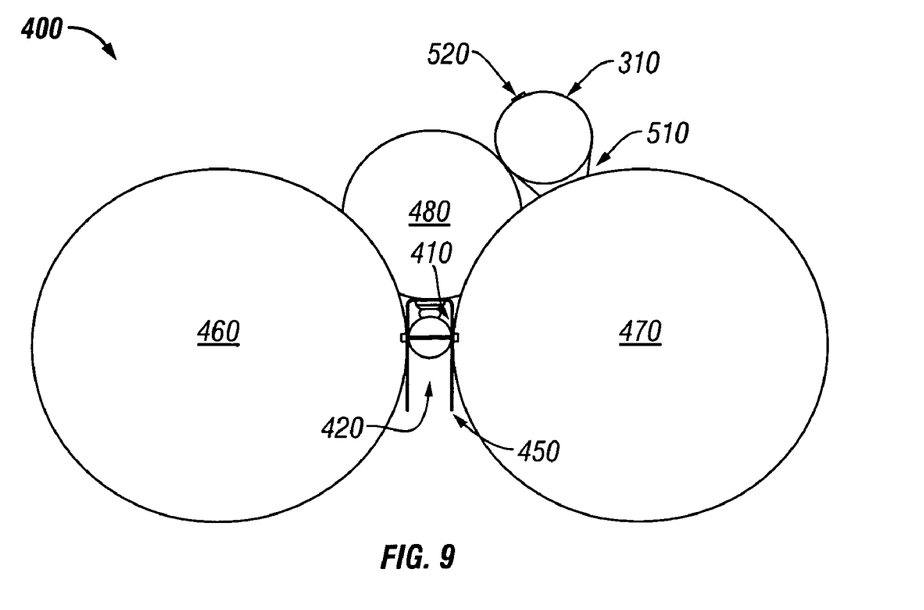
FIG. 9 is a front view of the emergency floatation system of FIG. 6 in a partially deployed configuration.

The floatation system 400 has three different configurations including: (1) a packed configuration as depicted in FIG. 8; (2) a partially deployed configuration as depicted in FIG. 9, wherein the plurality of floats 440 have been deployed, but the raft 310 remains packed; and (3) a fully deployed configuration, which incorporates the float configuration depicted in FIG. 9 in combination with the inflated life raft 310 depicted in FIG. 11. The floatation system 400 should remain in the packed configuration unless an emergency water landing is required.

The plurality of floats 440 are attached to the landing skid 420 by slipping the girt 410 over the top of the landing skid 420 and firmly securing the girt 410 to the landing skid 420 using fasteners 490. Alternatively, the girt 410 may be welded to the landing skid 420.

Figure 10:
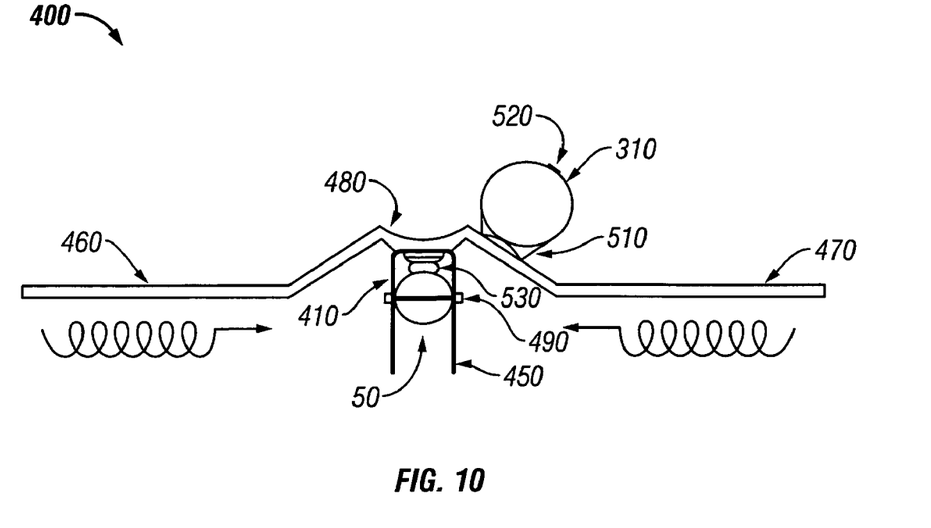
FIG. 10 is a front view of the emergency floatation system of FIG. 6 during packing.

As seen in FIG. 8, in the packed configuration, the flexible cover 450 surrounds the deflated floats 460, 470, 480, which are positioned around the packed life raft 310. The floats 460, 470, 480 are secured to the girt 410 by fixedly attaching the center float 480 to the top of the girt 30 using an adhesive such as cement, glue, epoxy resin, hinge tape or other adhesive. As best seen in FIG. 10, the deflated side floats 460, 470 are rolled inwardly toward the girt 410 when packing the floatation system 440.

The flexible cover 450 comprises two halves, which are fixedly attached to the girt 410 at one end and releasably attached at a second end using fasteners 500 such as strips of hook and loop fasteners, snaps, and/or laces. Preferably, these fasteners 500 are used in combination so that the cover 450 is tightly secured about the floats 460, 470, 480 and life raft 310.

As seen in FIG. 10, in some embodiments, the packed life raft 310 is surrounded by a flexible life raft cover 510, which attaches it to float 470. As would be understood to those of skill in the art, the life raft 310 may be attached at any number of locations on the floatation system 440 or the helicopter 305 without departing from the scope of the present invention. The flexible life raft cover 510 includes two halves that are fixedly attached to the large side float at one end and releasably attached at the other end using fasteners 520 such as snaps, hook and loop fasteners, laces or a combination thereof.

FIG. 9 shows the emergency floatation system 400 in a partially deployed configuration, wherein the floats 460, 470, 480 have been inflated for an emergency water landing, but the life raft 310 remains packed. Inflation of the floats 460, 470, 480 is achieved using of an actuator, such as an electrical or mechanical switch within the fuselage 350, to release a canister of compressed gas into an air hose, through an inlet check valve 530 and into the floats 460, 470, 480. The force of the compressed gas into the floats 460, 470, 480 must be sufficient to disengage the fasteners 500 and pop open the flexible cover 450. The canister of gas may be mounted underneath the helicopter 305 or within the helicopter fuselage 350. Helium is the preferred gas because it permits a very fast rate of inflation. Other suitable gases include Nitrogen and air.

Figure 15:
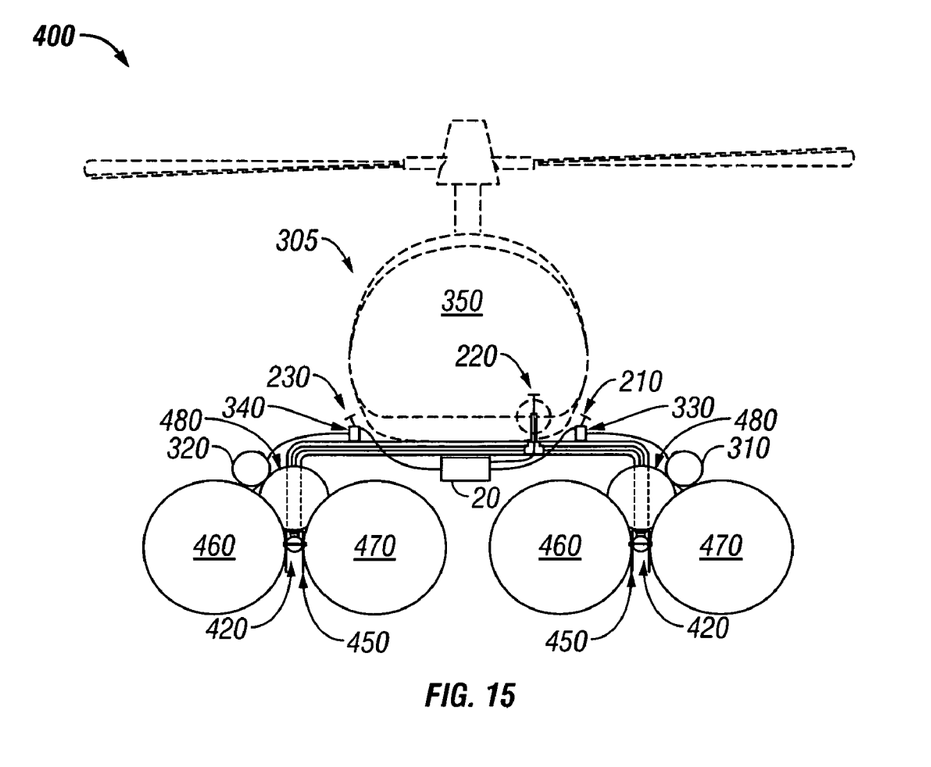
FIG. 15 is a front view of a helicopter including an emergency floatation system employing the safety trigger device of the present invention.

In the partially deployed configuration seen in FIG. 9, the center float 480 is positioned above the girt 410 and the side floats 460, 470 are positioned on either side of the girt 410, providing a wide footprint of buoyancy to support the helicopter 305 on a body of water. As best seen in FIG. 15, in some embodiments, a pair of life rafts 310, 320 are attached near the top of side floats 470, 480, respectively. As would be understood to those skilled in the art, the life rafts 310, 320 may be positioned at any number of alternative locations including, but not limited to, on top of the landing struts 355 or inside the fuselage 350.

After an emergency water landing, the life rafts 310, 320 may be needed to keep survivors afloat until help arrives. As seen in FIG. 15, the emergency floatation system 400 includes a safety device trigger, as herein disclosed with respect to FIGS. 1–5, for inflating the life rafts 310, 320 from canisters 330, 340 of compressed gas. According to other embodiments, the floatation system 400 includes a single life raft 310. The safety device trigger for inflating the rafts 310, 320 includes cam box 20, first handle 210 located on one side of the helicopter 305, second handle 220 located within fuselage 350 and third handle 230 located on the other side of the helicopter 305. Preferably, the first and second handles 210, 230 are located close to the helicopter doors for greater accessibility after an emergency water landing.

Referring to FIGS. 1–5 and 15, when any of the handles 210, 220, 230 are pulled, the cam 80 is forced to rotate about the pivot 90, thereby pulling both actuation cords 60, 70. Pulling actuation cord 60 opens a valve on canister 330 causing it to release compressed gas and inflate life raft 310 from the packed configuration depicted in FIG. 6 to the deployed configuration depicted in FIG. 11. Similarly, pulling actuation cord 70 opens a valve on canister 340 causing it to release compressed gas and inflate life raft 320 from the packed configuration depicted in FIG. 6 to the deployed configuration depicted in FIG. 11. Therefore, pulling any one of the handles 210, 220, 230 causes both life rafts 310, 320 to inflate.

As seen in FIG. 15, the canisters 330, 340 are positioned on top of the landing struts 355. According to other embodiments, the canisters 330, 340 are located within the fuselage 350 of the helicopter 305. A suitable location for the cam box 20 depends upon the type of helicopter employed. As seen in FIG. 15, according to some embodiments, the cam box 20 is mounted to the underside of the helicopter's landing struts 355. According to other embodiments, the cam box 20 is mounted within the fuselage 350.

Referring to FIGS. 9 and 15, when inflating the life rafts 310, 320, the force of the compressed gas into the rafts 310, 320 must be sufficient to disengage the fasteners 520 and pop open the flexible life raft cover 510. Nitrogen is a preferred gas because it permits a slower rate of inflation, and therefore, greater control of how the life raft 310 unfolds. Other suitable gases include Helium and air. In the fully deployed configuration, both the floats 460, 470, 480 and the life raft 310, 320 have been inflated.

Figure 11:
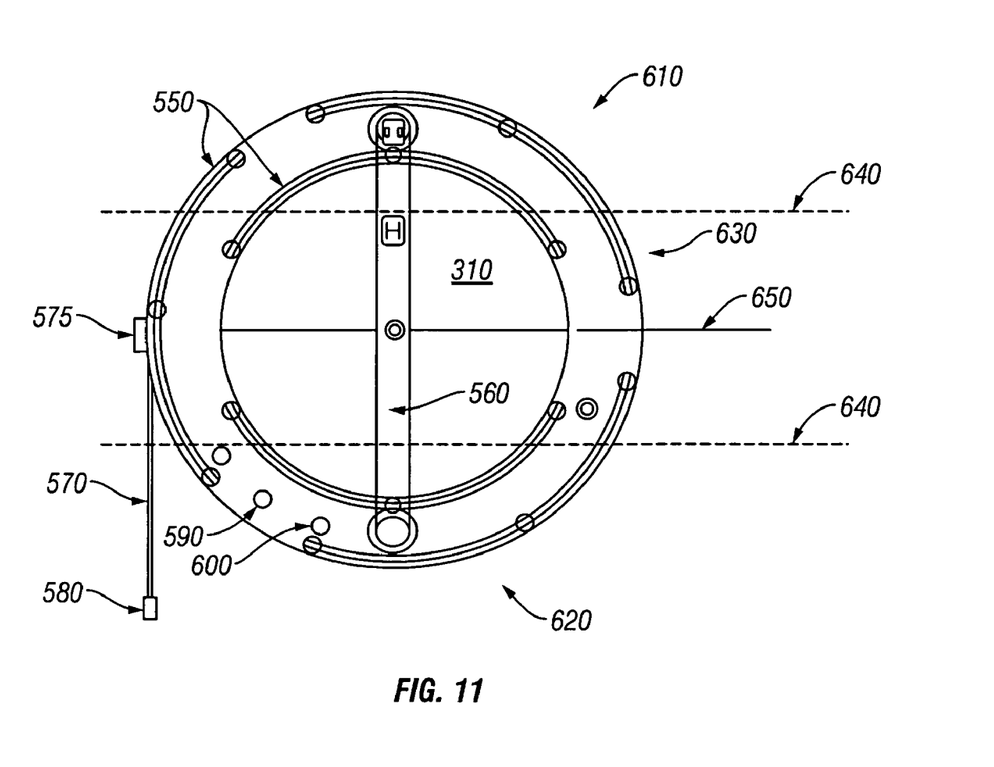
FIG. 11 is a top view of a life raft that is an element of the emergency floatation system of FIG. 6.

As seen in FIG. 11, according to some embodiments, the life raft 310 includes handles 550, a cross bar 560, an inflation hose 570 and an inlet check valve 575. Conveniently, the life raft 310 further includes a quick connector 580 having an automatic release mechanism for rapid detachment of the air hose 570 from the canister 330. The life raft 310 also includes a pressure relief valve 590 for the release of gas should the raft 310 overfill and a topping valve 600 for inflation of the life raft 310 using a hand pump.

Figure 12:
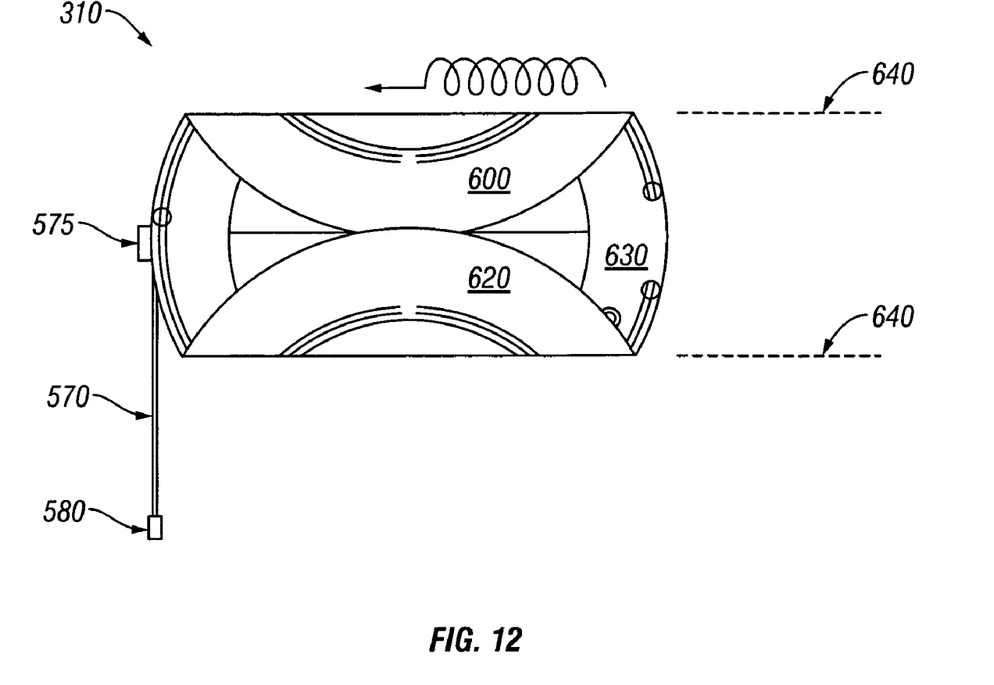
FIG. 12 is a top view of the life raft of FIG. 9 during packing.
Figure 13:
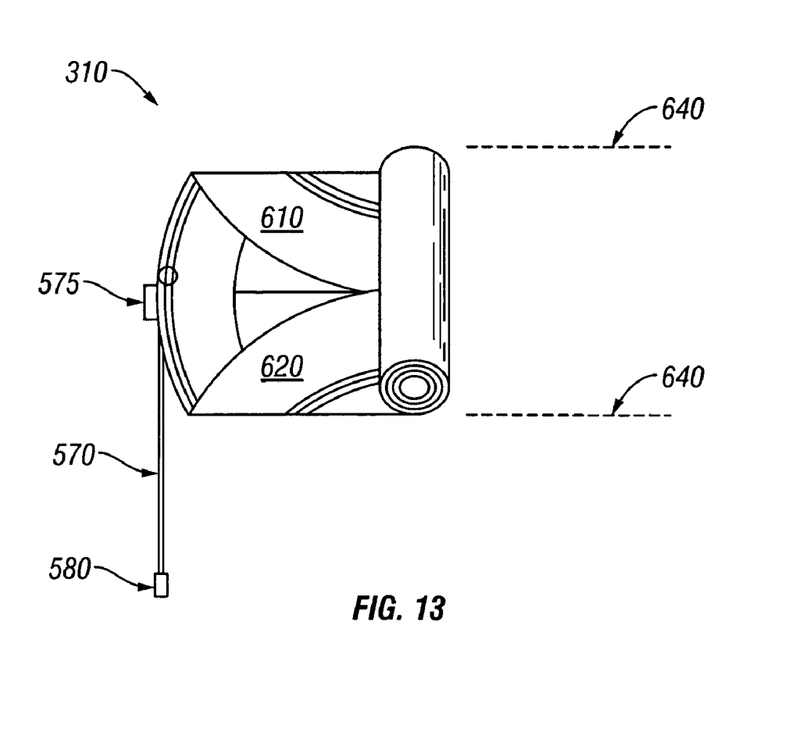
FIG. 13 is a top view of the life raft of FIG. 9 during packing.
Figure 14:
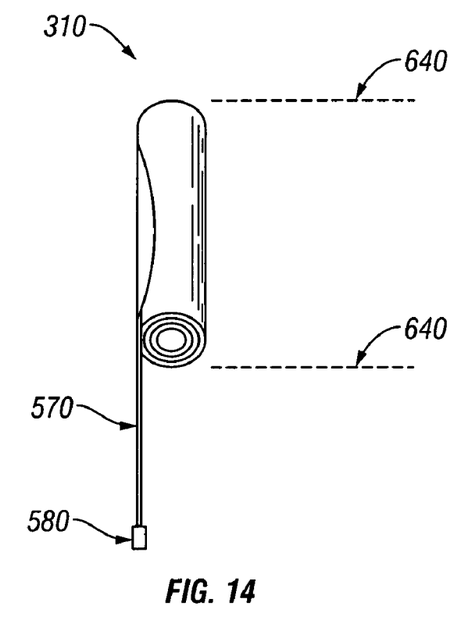
FIG. 14 is a top view of the life raft of FIG. 9 after packing.

Referring to FIGS. 11–14, a preferred method of folding the life raft 310 to ensure proper inflation will now be described. For folding purposes, the raft 310 is divided into a top section 610, a bottom section 620 and a middle section 630 separated by fold lines 640. After deflating the raft 310, the top section 610 and bottom section 620 are folded up and towards centerline 650, as depicted in FIG. 12. As best seen in FIGS. 13 and 14, the folded raft 310 is rolled up starting with the side opposite air hose 570 and rolling toward the air hose 570.

Thus, it is seen that a safety device trigger for an emergency floatation system for a helicopter is provided. One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description may practice the invention as well.

What is claimed is:

1. A safety trigger device for activating at least one aircraft safety device, comprising:
   a plurality of pull cord assemblies disposed at a plurality of locations throughout the aircraft;
   at least one actuation cord assembly; and
   a cam;
   wherein the pull cord assemblies coupled to the cam such that pulling any one of the plurality of pull cord assemblies rotates the cam which pulls on the actuation cord assembly such that it activates the at least one safety device.

2. The safety trigger device of claim 1, wherein each pull cord assembly includes a handle at one end and is attached to a first arm of the cam at the other end such that pulling the handle causes the cam to rotate.

3. The safety trigger device of claim 2, wherein each actuation cord assembly is attached to a second arm of the cam at one end and to a safety device at the other end.

4. The safety trigger device of claim 3, wherein rotation of the cam causes each actuation cord assembly to trigger the activation of the at least one safety device.

5. The safety trigger device of claim 4, wherein the cam includes a first arm attached to the plurality of pull cord assemblies and a second arm attached to the at least one actuation cord assembly.

6. The safety trigger device of claim 5, wherein at least one of the first arm and the second arm is bent to achieve a mechanical advantage in rotating the cam.

7. The safety trigger device of claim 1, further comprising a cam box for housing the cam.

8. The safety trigger device of claim 7, wherein the cam box is made from a durable, waterproof and rustproof material chosen from the group including stainless steel, aluminum, carbon fiber and hard plastic.

9. A safety trigger device for activating an aircraft safety device, comprising:
   a plurality of pull cords disposed at a plurality of locations throughout the aircraft;
   an actuation cord; and
   a cam including first and second arms;
   wherein the pull cords each include a handle at one end and is attached to the first arm at the other end such that pulling the handle causes the cam to rotate;
   wherein the actuation cord is attached to the second arm at one end and to a safety device at the other end.

10. The safety trigger device of claim 9, wherein rotation of the cam causes the actuation cord to trigger the activation of the safety device.

11. The safety trigger device of claim 9, wherein at least one of the first arm and the second arm is bent to achieve a mechanical advantage in rotating the cam.

12. The safety trigger device of claim 9, further comprising a cam box for housing the cam.

13. The safety trigger device of claim 12, wherein the cam box is made from a durable, waterproof and rustproof material chosen from the group including stainless steel, aluminum, carbon fiber and hard plastic.

* * * * *